(12) United States Patent
Macchiano, Sr. et al.

(10) Patent No.: US 8,549,094 B2
(45) Date of Patent: Oct. 1, 2013

(54) FACILITATING COMMUNICATION BETWEEN ISOLATED MEMORY SPACES OF A COMMUNICATIONS ENVIRONMENT

(75) Inventors: Angelo Macchiano, Sr., Apalachin, NY (US); Gustav E. Sittmann, III, Webster Groves, MO (US); Cynthia Sittmann, legal representative, Webster Groves, MO (US); Jerry W. Stevens, Raleigh, NC (US); Richard P. Tarcza, Kingston, NY (US); Alexandra Winter, Schwieberdingen (DE)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 13/172,978

(22) Filed: Jun. 30, 2011

(65) Prior Publication Data

US 2013/0007182 A1    Jan. 3, 2013

(51) Int. Cl.
*G06F 15/167* (2006.01)

(52) U.S. Cl.
USPC ........... 709/213; 709/219; 709/223; 709/224; 709/225; 709/226; 709/227; 709/228; 709/229

(58) Field of Classification Search
USPC ................ 709/213, 219, 223, 224, 225, 226, 709/227, 228, 229
See application file for complete search history.

(56) References Cited

U.S. PATENT DOCUMENTS

| | | | |
|---|---|---|---|
| 5,444,705 A | 8/1995 | Olnowich et al. | |
| 5,551,013 A | 8/1996 | Beausoleil et al. | |
| 5,574,873 A | 11/1996 | Davidian | |
| 5,604,742 A | 2/1997 | Colmant et al. | |
| 5,709,825 A | 1/1998 | Shih | |
| 6,009,261 A | 12/1999 | Scalzi et al. | |
| 6,308,255 B1 | 10/2001 | Gorishek, IV et al. | |
| 6,332,171 B1 | 12/2001 | Baskey et al. | |
| 6,345,241 B1 | 2/2002 | Brice et al. | |
| 6,463,582 B1 | 10/2002 | Lethin et al. | |
| 6,519,645 B2 | 2/2003 | Markos et al. | |
| 6,625,637 B1 * | 9/2003 | Cuesta et al. | 718/102 |
| 6,715,095 B1 | 3/2004 | Larsen et al. | |
| 7,035,262 B1 | 4/2006 | Joshi | |
| 7,103,586 B2 | 9/2006 | Holenstein et al. | |

(Continued)

FOREIGN PATENT DOCUMENTS

| | | |
|---|---|---|
| CN | 101044697 A | 9/2007 |
| CN | 101098217 A | 1/2008 |

OTHER PUBLICATIONS

International Search Report and Written Opinion for PCT/EP2012/058687 dated Oct. 22, 2012.

(Continued)

*Primary Examiner* — Firmin Backer
*Assistant Examiner* — Jonathan Bui
(74) *Attorney, Agent, or Firm* — John E. Campbell; Blanche E. Schiller, Esq.; Heslin Rothenberg Farley & Mesiti P.C.

(57) ABSTRACT

Automatically converting a synchronous data transfer to an asynchronous data transfer. Data to be transferred from a sender to a receiver is initiated using a synchronous data transfer protocol. Responsive to a determination that the data is to be sent asynchronously, the data transfer is automatically converted from the synchronous data transfer to the asynchronous data transfer.

20 Claims, 14 Drawing Sheets

(56) References Cited

U.S. PATENT DOCUMENTS 7,739,351 B2 * 6/2010 Shkvarchuk et al. ......... 709/217
7,915,924 B2    3/2011 Waldrop
7,941,799 B2    5/2011 Easton et al.
2007/0223496 A1 9/2007 Izumi

OTHER PUBLICATIONS

"z/Architecture—Principles of Operation," SA22-7832-08, Ninth Edition, Aug. 2010.

Takase et al., "ATM Transport Node for Flexible and Robust Access Networks," Global Telecommunications Conference, 1993, including a Communications Theory Mini-Conference; Technical Program Conference Record, IEEE in Houston, Globecom '93, IEEE Digital Object Identifier: 10/1109/GLOCOM.1993.318318, pp. 1481-1487, vol. 3.

Leikam, et al., "Programmable Dual Modem Adapter for a Communication Interface," TBD 11-79, p. 2212-2213, Nov. 1, 1979.

Macchiano, Angelo Sr., et al., "Facilitating Communication Between Isolated Memory Spaces of a Communications Environment," U.S. Appl. No. 13/722,976, filed Dec. 20, 2012, pp. 1-57.

* cited by examiner

FACILITATING COMMUNICATION BETWEEN ISOLATED MEMORY SPACES OF A COMMUNICATIONS ENVIRONMENT

BACKGROUND

One aspect of the present invention relates, in general, to communicating within a communications environment, and in particular, to facilitating the transfer of data between isolated memory spaces of the communications environment.

To transfer data between isolated memory spaces, networking technology and protocols are typically used. For instance, data may be sent from one isolated memory space to another isolated memory space using a TCP/IP protocol over an Ethernet link. The current networking technology enables the data to be sent either synchronously or asynchronously. This is an exclusive choice on the part of the sender.

When data is sent synchronously, the sender is suspended until the data transfer is complete. On the other hand, if the data is sent asynchronously, then the sender may continue operations.

BRIEF SUMMARY

The shortcomings of the prior art are overcome and additional advantages are provided through the provision of a computer program product for facilitating communications in a communications environment. The computer program product includes a storage medium readable by a processing circuit and storing instructions for execution by the processing circuit for performing a method. The method includes, for instance, obtaining, by a processor of the communications environment from a sender of the communications environment, pre-authorization to convert from a synchronous data transfer to an asynchronous data transfer; obtaining, by the processor from the sender, a request to send data to a receiver of the communications environment; initiating, by the processor, a sending of the data to the receiver, wherein the initiating employs the synchronous data transfer; determining, by the processor, that the synchronous data transfer is to be converted to an asynchronous data transfer; and responsive to the determining, automatically converting by the processor the synchronous data transfer to the asynchronous data transfer to complete the sending of the data to the receiver, wherein the automatically converting is independent of actions by the sender other than the pre-authorization.

Methods and systems relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a capability is provided for automatically converting a synchronous data transfer to an asynchronous data transfer. For example, a synchronous data transfer is automatically converted to an asynchronous data transfer, responsive to a determination that there is a delay in completing the data transfer, such as, for instance, the receiver of the data is unable to receive the data at the time of the transfer. The conversion from a synchronous data transfer to an asynchronous data transfer is performed automatically in that it is not at the request of the sender (or the receiver), and the sender (or receiver) does not have knowledge of the conversion at the time the conversion is initiated. Further, at the time of the conversion, the sender (or receiver) need not take any action or intervene in the conversion.

Figure 1:
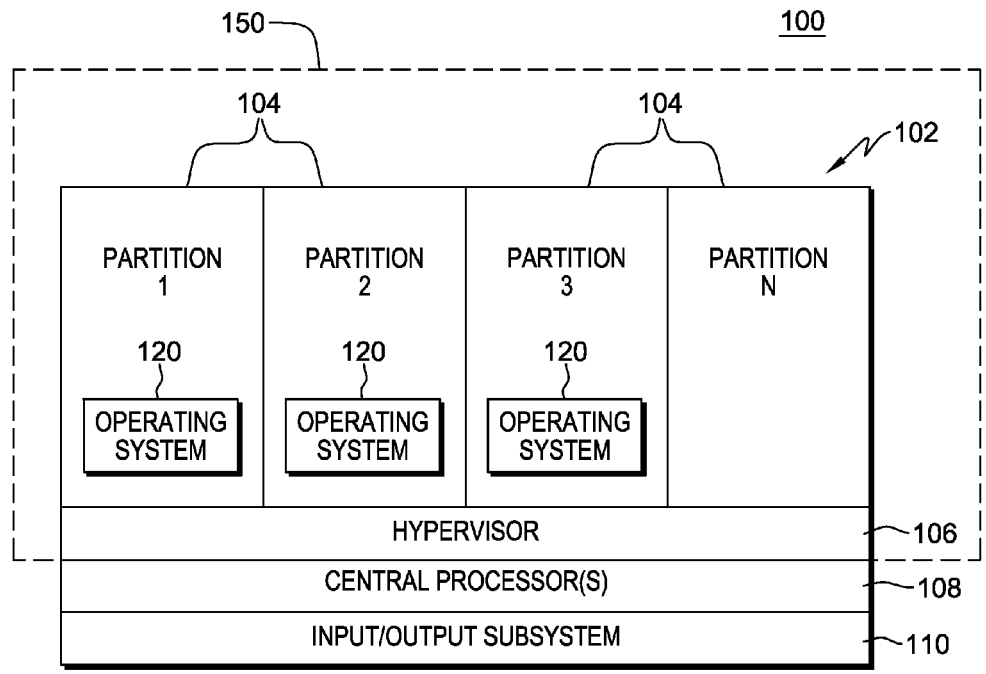
FIG. 1 depicts one example of a communications environment to incorporate and/or use one or more aspects of the present invention.

One embodiment of a communications environment to incorporate and/or use one or more aspects of the present invention is described with reference to FIG. 1. In one example, a communications environment 100 includes a central processor complex (CPC) 102, which is based on the z/Architecture®, offered by International Business Machines Corporation (IBM®). Aspects of the z/Architecture® are described in an IBM® publication entitled "z/Architecture Principles of Operation," IBM Publication No. SA22-7832-08, August 2010, which is hereby incorporated herein by reference in its entirety. One system that may include central processor complex 102 is the zEnterprise 196 (z196) system offered by International Business Machines Corporation, Armonk, N.Y. IBM® and z/Architecture® are registered trademarks, and zEnterprise 196 and z196 are trademarks of International Business Machines Corporation, Armonk, N.Y., USA. Other names used herein may be registered trademarks, trademarks or product names of International Business Machines Corporation or other companies.

Central processor complex 102 includes, for instance, one or more partitions 104, a hypervisor 106, one or more central processors 108, and one or more components of an input/output subsystem 110. One or more partitions 104, in this example, are logical partitions (a.k.a., LPARs), which include a set of the system's hardware resources virtualized as a separate system.

Each logical partition 104 is capable of functioning as a separate system. That is, each logical partition can be independently reset, initially loaded with an operating system 120, if desired, and operate with different programs. An operating system or application program running in a logical partition appears to have access to a full and complete system, but in reality, only a portion of it is available. A combination of hardware and licensed internal code (LIC), referred to as firmware, keeps a program in a logical partition from interfering with a program in a different logical partition. This allows several different logical partitions to operate on a single or multiple physical processors in a time-slice manner. In this example, a number of the logical partitions have a resident operating system 120, which may differ for one or more logical partitions. In one embodiment, operating system 120 is the z/OS® operating system, offered by International Business Machines Corporation, Armonk, N.Y.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Logical partitions 104 are managed by hypervisor 106, which is implemented by firmware running on central processors 108. One example of hypervisor 106 is the Processor Resource/Systems Manager (PR/SM™), offered by International Business Machines Corporation, Armonk, N.Y.

Central processors 108 are physical processor resources that are allocated to the logical partitions. For instance, a logical partition 104 includes one or more logical processors, each of which represents all or a share of a physical processor resource 108 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 and hypervisor 106 each comprises one or more programs residing in respective portions of main memory 150 associated with the central processors. In one example, each logical partition is assigned a portion of main memory, referred to as a memory space, as described in further detail with reference to FIG. 2.

Figure 2:
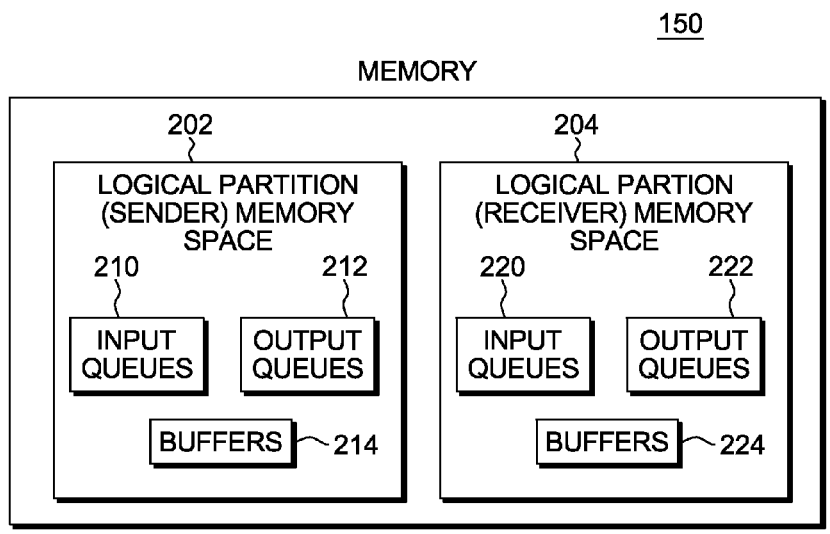
FIG. 2 depicts examples of memory spaces associated with logical partitions of FIG. 1, in accordance with an aspect of the present invention.

Referring to FIG. 2, in one embodiment, main memory 150 includes a plurality of memory spaces, each comprising a range of addresses in main memory. A memory space may be assigned to an entity, such as a logical partition or other entity. In the example shown in FIG. 2, there are two memory spaces assigned to two logical partitions, respectively. One memory space is referred to herein as the sender's memory space 202, and the other memory space is referred to as the receiver's memory space 204, since communications between a sender and a receiver are described further below. Sender's memory space 202 includes, for instance, one or more input queues 210, one or more output queues 212, and one or more buffers 214. Similarly, receiver's memory space 204 includes one or more input queues 220, one or more output queues 222, and one or more buffers 224. The use of the queues and buffers are described further below.

The individual memory spaces are isolated from one another in that data cannot be written directly from one memory space to the other memory space without control by the firmware. In one example, networking transmissions using, for instance, TCP/IP over Ethernet links, is used to transfer data from one memory space to another memory space. In one particular example, a technology offered by International Business Machines Corporation, referred to as HiperSockets™, is used to perform the transfer.

HiperSockets™ provides high-speed TCP/IP connectivity within a central processor complex. It eliminates the need for any physical cabling or external networking connections between servers running in different logical partitions. Instead, communication is through the system memory of the processor. The HiperSockets™ implementation is based on the OSA-Express Queued Direct I/O (QDIO) protocol. The firmware emulates the link control layer of an OSA-Express QDIO interface.

Data transfer from one memory space to another memory space using networking technology is, for instance, synchronous, in which after initiating a data transfer, the sender is suspended until the transfer is complete. One example of a synchronous data transfer from one memory space to another is described with reference to FIG. 3.

Figure 3:
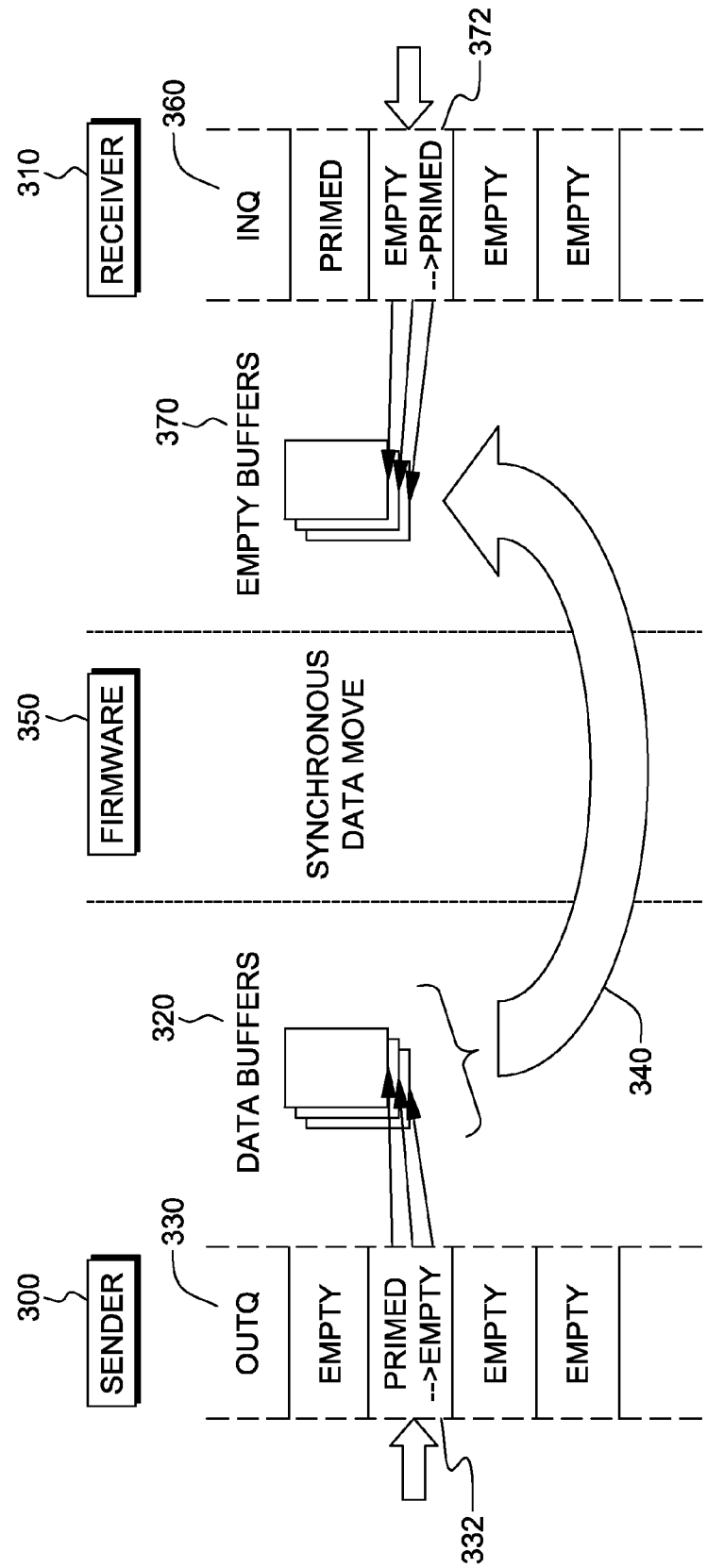
FIG. 3 depicts one example of a synchronous outbound data transfer used in accordance with an aspect of the present invention.

Referring to FIG. 3, a sender 300, such as a TCP/IP stack or a program running in the sender's memory space, initiates a request to send data to a receiver 310, such as another TCP/IP stack or program, as examples, in the receiver's memory space. Since the receiver's memory space is isolated from the sender's memory space, in this example, a network communications protocol is used to perform a synchronous data transmission of the data being sent from the sender to the receiver. Using a synchronous data transfer provides a very fast, low latency direct communications path between the sender and the receiver by performing a memory transfer from one location to another under control of the firmware. In one example, the memory-to-memory data transfer is performed by HiperSockets™. This transfer mechanism is very efficient as long as the receiver can receive the data at the same rate or faster than the sender is sending the data.

To transfer the data, the sender takes the data contained within a selected data buffer 320 and places it on an output queue 330 of the sender. For example, a pointer 332 of the selected data buffer is placed on the output queue. Then, sender 300 signals 340 the processor to perform the data transfer to receiver 310. In one example, it is firmware 350 of the processor that is signaled and is going to perform the transfer; however, in other examples, it is not firmware, but other code and/or hardware of the processor.

Responsive to receiving the signal requesting a data transfer from the sender to the receiver, the firmware copies the data from the sender's output queue and places it on the receiver's input queue 360. For example, the data is copied to an empty buffer 370 and a pointer 372 to that data is placed in input queue 360. Subsequent to completing the data transfer, the firmware provides a signal back to the sender that the transfer is complete. Until the sender receives this completion signal, the sender is suspended and cannot perform any other operations.

As one particular example, to signal the processor, the sender issues a Signal Adapter (SIGA) instruction, which designates a write function (SIGA-w) that signals the processor that one or more output queues have data to be transmitted to the receiver. The write function is specified as a function code provided in a first general register used by the instruction and an address of the network connection (e.g., a subsystem identification word) of the write function is indicated in a second general register used by the instruction. Further, the output queues are specified in yet a third general register used by the instruction.

In this particular example, the queues are implemented as Queued Direct I/O (QDIO) queues, and each queue has a plurality of buffers associated therewith, as well as various control information. In one embodiment, a QDIO queue includes data structures that describe the queue, as well as buffer storage blocks that are used for data transfer. As one example, the multiple storage data structures, called queue components, that collectively describe the queue's characteristics and provide the controls to allow the exchange of data, include, for instance:

A queue information block (QIB) that includes information about the collection of QDIO input and output queues. The QIB includes a storage list information block (SLIB) address for input queues and an SLIB address for output queues.

There is one SLIB for each queue, and each SLIB provides information about the queue and each queue buffer of the queue. Each SLIB has a header and one or more entries, called storage list information block entries (SLIBEs) containing information about each of the buffers for each queue. In one example, each storage list information block includes an address of a next storage list information block, an address of a storage list (SL) and an address of a storage list state block (SLSB).

There is one storage list defined for each queue, and a SL includes, for instance, 128 entries, one entry for each of the buffers of the queue. The storage list provides information about the I/O buffer locations in main storage. Each entry includes the absolute address of a storage block address list (SBAL). Each storage block address list includes a list of absolute addresses of the storage blocks that collectively make up one of the data buffers associated with each queue.

A storage block list entry (SBALE) is provided as part of each SBAL. Each SBALE includes the absolute storage address of a storage block. Collectively, the storage blocks addressed by all the entries of a single SBAL constitute one of the many possible QDIO buffers of a QDIO queue. In one example, a QDIO queue may have 128 QDIO buffers associated therewith.

The SLSB includes state indicators that provide state information about the buffers that make up the queue.

Further details regarding SIGA, QDIO queues, and associated control structures, are described in U.S. Pat. No. 6,332,171 B1, entitled "Self-Contained Queues With Associated Control Information For Receipt And Transfer Of Incoming And Outgoing Data Using A Queued Direct Input-Output Device," Baskey et al., issued Dec. 18, 2001; U.S. Pat. No. 6,345,241 B1, entitled "Method And Apparatus For Simulation Of Data In a Virtual Environment Using A Queued Direct Input-Output Device," Brice et al., issued Feb. 5, 2002; U.S. Pat. No. 6,519,645 B2, entitled "Method And Apparatus For Providing Configuration Information Using A Queued Direct Input-Output Device," Markos et al., issued Feb. 11, 2003; and U.S. Pat. No. 7,941,799 B2, entitled "Interpreting I/O Operation Requests From Pageable Guests Without Host Intervention," Easton et al., issued May 10, 2011, each of which is hereby incorporated herein by reference in its entirety.

In the above processing, when a receiver is unable to provide empty buffers at the same rate the sender is sending data, increased latency and CPU overhead is introduced on the sender's side due to the synchronous nature of the protocol. When an empty buffer is not available on the receiver, the sender has two options. It can either go through the overhead of queuing the failing operation and subsequent data retransmission to the same receiver, or discard the data allowing an upper level communications protocol, like TCP/IP, to redrive the operation. The pitfalls of queuing and retransmitting the data are that it not only requires additional CPU cycles to recover, but potentially can block or delay further transmissions by the sender to other destinations, which may be able to accept incoming data.

Virtualized environments which allow multiple servers (e.g., senders, receivers) to share CPU resources are more likely to create situations where a receiver may not be able to keep up with various senders sending data to it. This is typically the case when a hypervisor, like PR/SM, controls dispatching of servers on various available shared processors. The problem is compounded when there are multiple levels of hypervisors between the sender and the shared CPU resource. This is the case, for instance, when the sender is running in a virtual machine under z/VM®, which is also running in a logical partition. Here, two hypervisors are to dispatch the server to allow it to replenish empty buffers in a timely fashion.

Dispatching the receiver in a timely fashion is not a problem when there are sufficient CPU resources available. The synchronous data transfer only breaks down when CPU resources become constrained either for the short or long term. Thus, in accordance with an aspect of the present invention, the sender is able to exploit a synchronous low latency data transmission in a non-constraint CPU environment, while eliminating the associated pitfalls and overhead when CPU resources become constrained. This is accomplished by converting the communications protocol from synchronous to asynchronous when the receiver is unable to keep up with the sender. In one embodiment, the synchronous to asynchronous protocol conversion is performed automatically without any pushback to the sender (i.e., the sender need not perform any action at the time of the conversion). This eliminates the sender from having to do any type of recovery processing, or block or slow down data transmissions to other receivers when CPU resources become constrained for a particular receiver. Further, it allows for synchronous communications to resume automatically to a receiver that was previously constrained.

Figure 4:
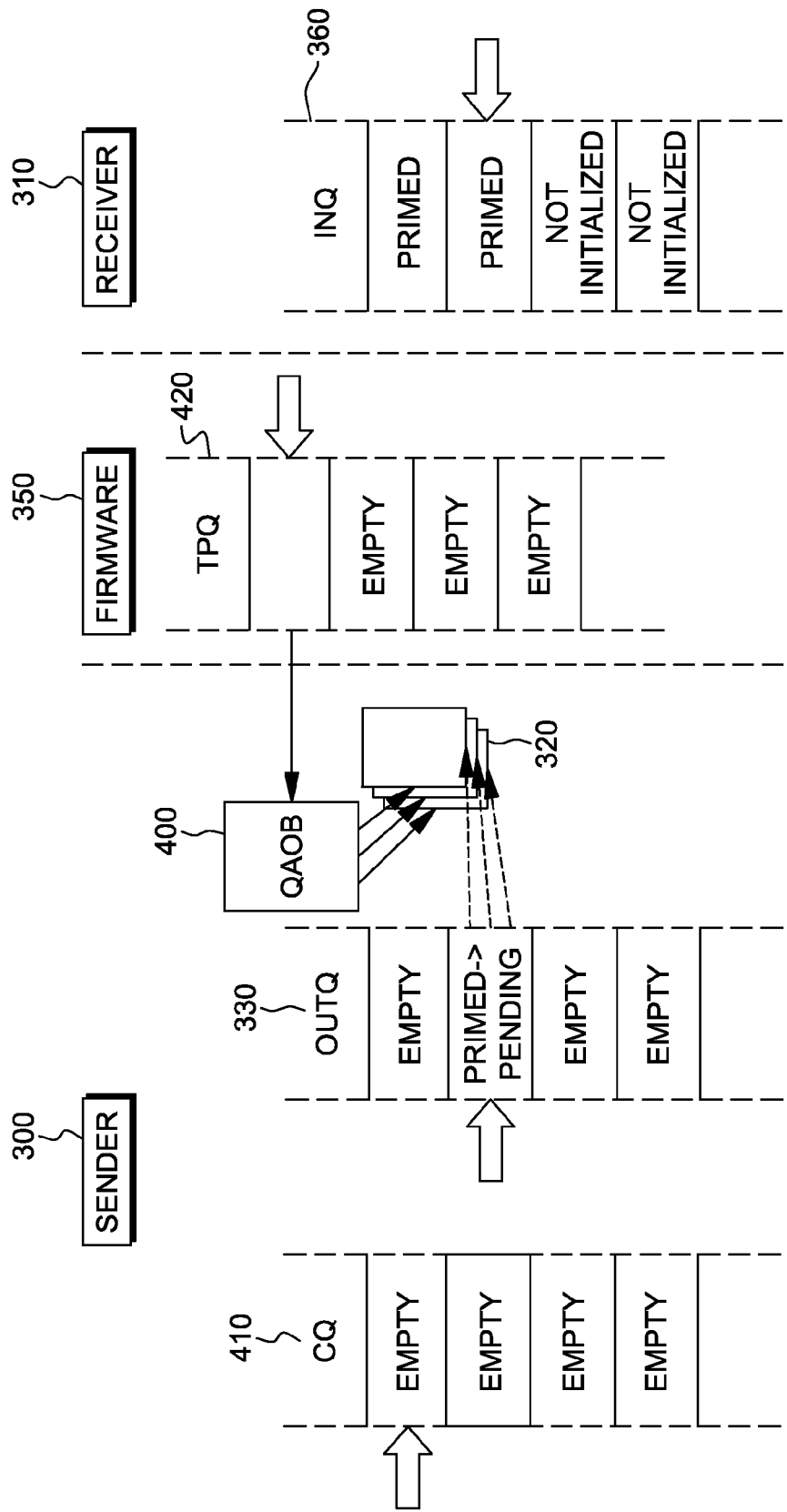
FIG. 4 depicts examples of control structures used to automatically convert from a synchronous data transfer to an asynchronous data transfer, in accordance with an aspect of the present invention.

In accordance with an aspect of the present invention, a capability is provided for the sender to queue data within its memory until the receiver provides empty buffers which can receive the data. To facilitate this processing, one or more control structures are used, as described with reference to FIG. 4. For instance, the sender allocates an empty block of memory 400 in the sender's memory for each pending asynchronous transfer. In one example, there can be X number of these blocks at any one time, in which X is model dependent and configurable. X represents the number of concurrent asynchronous requests allowed by the sender. This block of memory, referred to as a QDIO (Queued Direct Input/Output) asynchronous operation block (QAOB), is used to keep track of the asynchronous data transfer until firmware completes the operation. The QAOB contains only control information and not the data itself, in this example. The sender provides this block when initiating a data transfer for requests it will allow to optionally execute asynchronously; otherwise, it need not provide the control block. This gives the sender the ability to control the maximum number of outstanding asynchronous requests. The QAOB itself is only used and initialized by firmware, when it determines the data transfer is to be performed asynchronously. There is nothing the sender has to do for the data transfer other than provide memory for the QAOB, in case the data transfer is to be performed asynchronously.

In one particular example, the QAOB is included in the SIGA instruction that provides the request. The sender issues a SIGA write with QAOB (SIGA-wq) instruction that specifies a selected function code in the first general register indicating the write with QAOB function. The QAOB address is specified in a fourth general register used by the instruction. This general register either has a 0 when no QAOB is specified or an absolute address of a QAOB (e.g., a 256 byte QAOB). The firmware, responsive to the write with QAOB function code being set, determines whether a QAOB is specified in the fourth general register that can be used in an asynchronous data transfer.

When firmware changes the data transfer to an asynchronous protocol, it uses the QAOB to keep track of the data residing in the sender's memory associated with the outbound data transfer. In the example in which HiperSockets™ is used for the transmission, the QAOB keeps track of the addresses and controls specified by the sender in a Storage Block Address List (SBAL) associated with the data transfer. Examples of the fields extracted from the SBAL and placed in the QAOB include, for instance:

All meaningful SBALEs from the SBAL (e.g., the first SBALE to the SBALE with the last entry bit set). This includes the absolute buffer address of the data and a byte count;
The output queue number for the SBAL;
The buffer number (e.g., 1-27) of the SBAL initiating the request;
The number of meaningful SBALE entries; and
The storage key used to access the storage blocks designated by each meaningful SBALE.

In addition to the QAOB, another control structure referred to as a completion queue (CQ) 410 is used. That is, in one example, in addition to providing a QAOB, the sender also allocates a new type of queue, a completion queue, in its memory when establishing communication queues. In the case of HiperSockets™, this is a new type of QDIO input queue with SBALs, but without buffers associated with the SBALEs. This new input queue is not used to transfer data; rather it is used by firmware to post completion events to signal a sender that an asynchronous data transfer has completed. When a queue entry becomes 'inbound primed', the information about the completion event is located in the SBALEs themselves, which are included on the completion queue. Firmware posts the address of the QAOB associated with the completed asynchronous data transfer in the CQ and generates an interruption, if necessary, to signal the sender of the completed data transfer. At which point the sender can reuse the memory associated with the completed operation for other purposes. (In one embodiment, a SBALE is used to post a single completion event. Since a SBAL includes, for instance, 16 SBALEs, firmware can post up to 16 completion events (QAOBs) within a single SBAL.)

Further, in one embodiment, the firmware has another queue, TPQ 420 on each intended recipient, used to remember that it has an outstanding data transfer request.

Figure 5A:
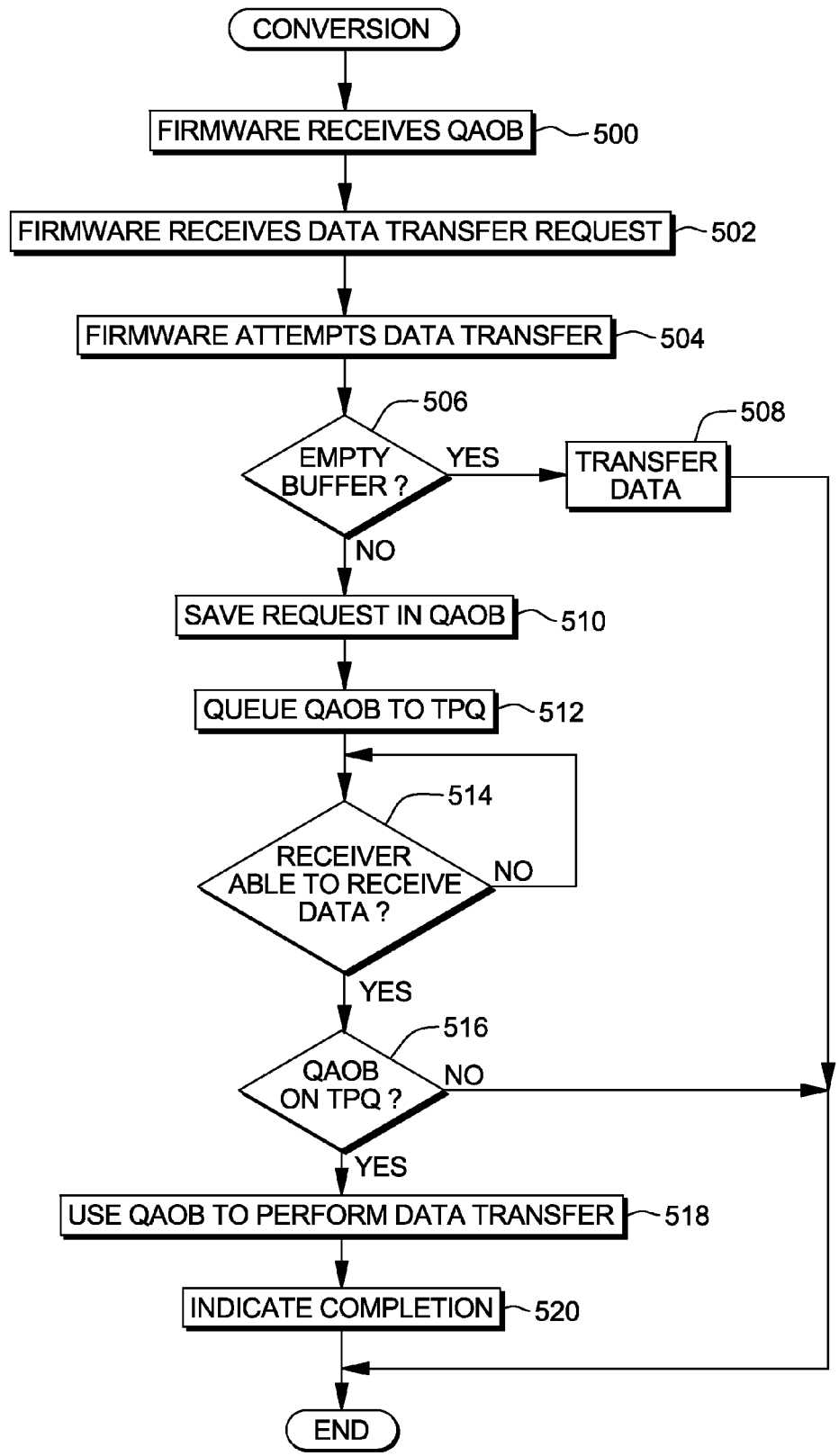
FIG. 5A depicts one embodiment of the logic to automatically convert a synchronous data transfer to an asynchronous data transfer, in accordance with an aspect of the present invention.

Further details regarding conversion from a synchronous data transfer to an asynchronous data transfer are described with reference to FIGS. 5A-5B. FIG. 5A depicts one embodiment of the logic used by firmware to perform the conversion, and FIG. 5B pictorially depicts one example of the conversion. Both figures are referenced in the discussion below.

Figure 5B:
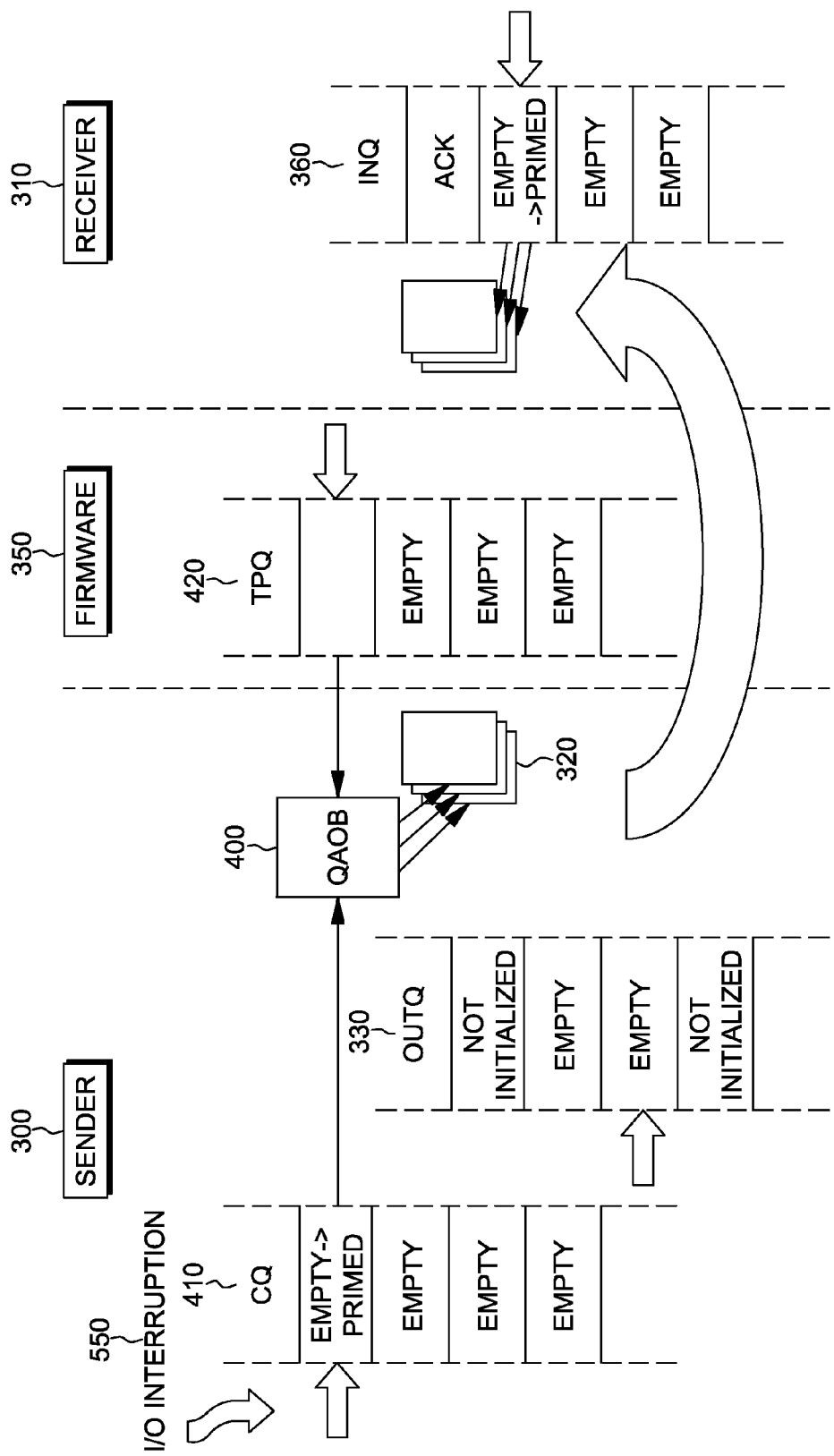
FIG. 5B pictorially depicts one example of successful completion of an asynchronous data transfer, in accordance with an aspect of the present invention.

Referring to FIGS. 5A-5B, initially, firmware 350 receives an indication of the QAOB (e.g., an address of a storage block that may be used for an asynchronous data transfer), STEP 500. Therefore, it knows that, if needed (or desired), it may perform a requested data transfer asynchronously. In one embodiment, the firmware may receive a plurality of QAOBs indicating that it may perform up to that number of data transfers asynchronously. The providing of a QAOB by the sender is pre-authorization to the firmware that the firmware may perform the data transfer asynchronously, if it so chooses.

In one particular example, the QAOB is included as part of a data transfer request received by the firmware from sender 300, STEP 502. Responsive to receiving the data transfer request, the firmware attempts to send the data to the receiver, STEP 504. If the receiver is able to receive the data (e.g., there is an empty buffer at the receiver), INQUIRY 506, then the data is transferred synchronously, STEP 508, and the data transfer is complete. Thereafter, the sender can perform another data transfer, and if asynchronous processing is permitted by the sender, the sender can include the QAOB in the new request.

However, if the receiver is unable to currently receive the data (e.g., there is not an empty buffer at the receiver, as determined by buffer state, and therefore, the receiver is delayed in receiving the data), then the data transfer is automatically converted from a synchronous request to an asynchronous request by the firmware, assuming a QAOB was provided in the request. The request is saved in the QAOB, STEP 510, and the QAOB is queued on TPQ 420 on its intended destination by, for instance, placing a pointer to the QAOB on the TPQ, STEP 512. The QAOB now includes contents of the SBAL, and therefore, the SBAL can be used for other processing.

In one embodiment, if a QAOB is not specified, then the request fails or waits until it can be sent synchronously.

In one example, responsive to the QAOB being queued, control is given to the sending server with an indication that the specified QAOB is being used to perform this data transfer asynchronously. The sending server can then immediately setup for its next data transfer, and optionally, allocate another QAOB in case it is needed for the subsequent data transfer.

Next, a determination is made as to whether the receiver is able to receive the data, INQUIRY 514. As examples, a determination is made as to whether the firmware has received a signal from the receiver that it is now able to accept data (e.g., there are empty buffers now available) or whether the firmware has determined that a buffer is available by checking the state of buffers. In one particular example, the receiver uses the SIGA instruction to signal firmware that it placed empty buffers on its input queues. A SIGA read (SIGA-r) function code is specified in the first general register. The SIGA read function causes firmware to transfer any pending packets from the receiver's TPQ to the target's input buffers.

If the receiver cannot accept the data, then the firmware waits. Otherwise, if the receiver is able to receive the data (e.g., there is at least one empty buffer), the firmware determines whether it has a pointer to a QAOB on the receiver's TPQ, INQUIRY 518. If not, processing is complete. Otherwise, firmware uses the QAOB to perform the data transfer. In particular, it forwards the data pointed to by the QAOB to the receiver, placing that data in the empty buffer and placing a pointer to the now filled buffer on the receiver's input queue.

Thereafter, the firmware indicates to the sender completion of the data transfer, STEP 520. In one example, this indication includes posting the address of the QAOB associated with the completed asynchronous data transfer in completion queue 410 (FIG. 5B) of the sender, and generating an interruption 550, if necessary, to signal the sender of the completed data transfer. At which point, the sender can reuse the memory associated with the completed operation for other purposes. The QAOB posted on the CQ includes information regarding the asynchronous processing, including, for instance, state information, completion codes, error codes, etc.

In one particular example, when the address of the QAOB is posted in a completion queue entry (i.e., the QAOB address is included in an SBALE located in an entry of the completion queue), firmware returns the following information to the program in the QAOB, as an example:

A reasons code reflecting the results of the asynchronous I/O operation, and

Buffer State: "State of Queue—Buffer N (SQBN)" for the asynchronous data transfer. This is the same value that would be placed in an SLSB for a synchronous data transfer. An SQBN contains a value indicating the current state of the QAOB. The state value includes, for instance, two parts: a first part that indicates whether the buffer is owned by the program firmware; and a second part that indicates the current process state of the QAOB.

Although the particular request is performed asynchronously, other requests from the sender to other receivers may be performed synchronously unless a particular receiver is, for instance, delayed in receiving data. Further, other requests to the receiver from the sender automatically revert to being synchronous unless it is determined again that the receiver is delayed in receiving data. For instance, the firmware attempts to send the data to the receiver, as described above, and if the receiver is able to receive the data, it is sent synchronously. In one embodiment, even though transmissions are converted between synchronous and asynchronous, data remains in the same FIFO order as it was transmitted. Firmware will transfer all queued QAOBs on the receivers TPQ 420 before any future synchronous requests are received from this or any other sender. If another synchronous data transfer occurs to a receiver that already has QAOBs on its TPQ 420, it will automatically be converted to an asynchronous request by firmware (if authorized by the sender) or failed with a no available buffers response. Preserving the order avoids costly reordering processing, enhancing the receiver's TCP/IP stack's performance and overall CPU utilization.

Described in detail above is a capability for automatically converting a synchronous data transfer to an asynchronous data transfer, responsive to the processor (e.g., firmware) determining that such a conversion is to take place. As examples, the conversion is performed responsive to the receiver being delayed in being able to receive the data (e.g., no available buffer, slow in responding, etc.). Further, the capability enables other transfers to the same receiver to automatically be performed synchronously.

One or more aspects of this support provide the capability to adjust to transient or longer term data transmission without costly retransmits with the target destination coupled with minimal or no effect on other functioning destinations in the network. In one aspect, a capability is provided to switch back and forth between synchronous and asynchronous data transfer, without pushback to the sender program. In one particular example using a HiperSockets Completion Queue (CQ), the device driver does not suspend the I/O operation (SIGA does not block the process). With CQ, the write process is put aside and allows the sender to continue to issue additional writes (SIGA(s)) to the same target or to other targets where some might be completing synchronously and others are completing asynchronously. This non-blocking aspect makes the CQ asynchronous.

In accordance with an aspect of the present invention, the data is copied only once from the sender to the receiver (no internal buffer), regardless if the transfer is synchronous or asynchronous.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more non-transitory computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
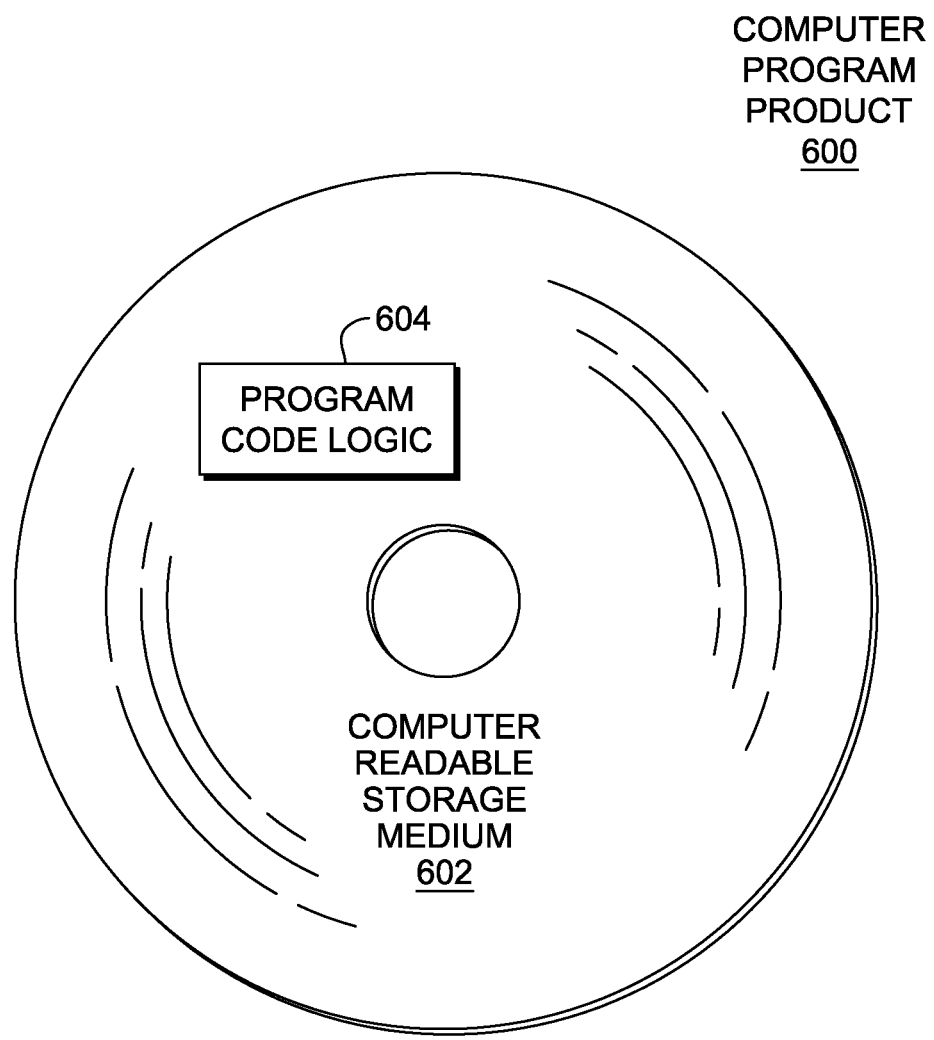
FIG. 6 depicts one embodiment of a computer program product incorporating one or more aspects of the present invention.

Referring now to FIG. 6, in one example, a computer program product 600 includes, for instance, one or more non-transitory computer readable storage media 602 to store computer readable program code means or logic 604 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than zEnterprise servers can include, use and/or benefit from one or more aspects of the present invention. Further, the conversion from synchronous to asynchronous may be responsive to considerations other than whether a buffer is available. Yet further, one or more aspects of the present invention can be used for any memory-to-memory transfers between isolated memory spaces. Many other variations are also possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 7:
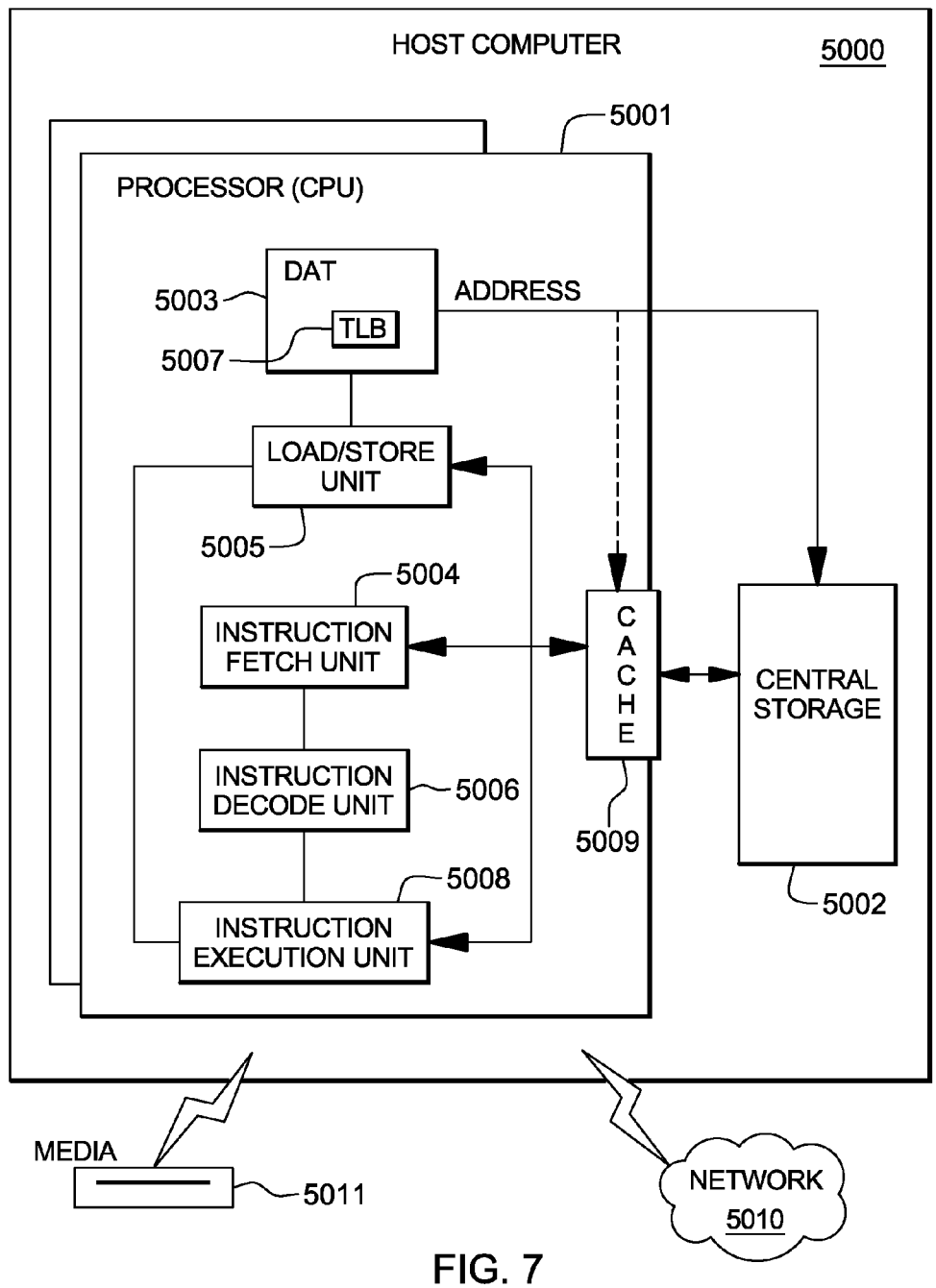
FIG. 7 depicts one embodiment of a host computer system to incorporate and use one or more aspects of the present invention.

Referring to FIG. 7, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture®). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects the present invention). Referring to FIG. 7, software program code which embodies one or more aspects of the present invention may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 8:
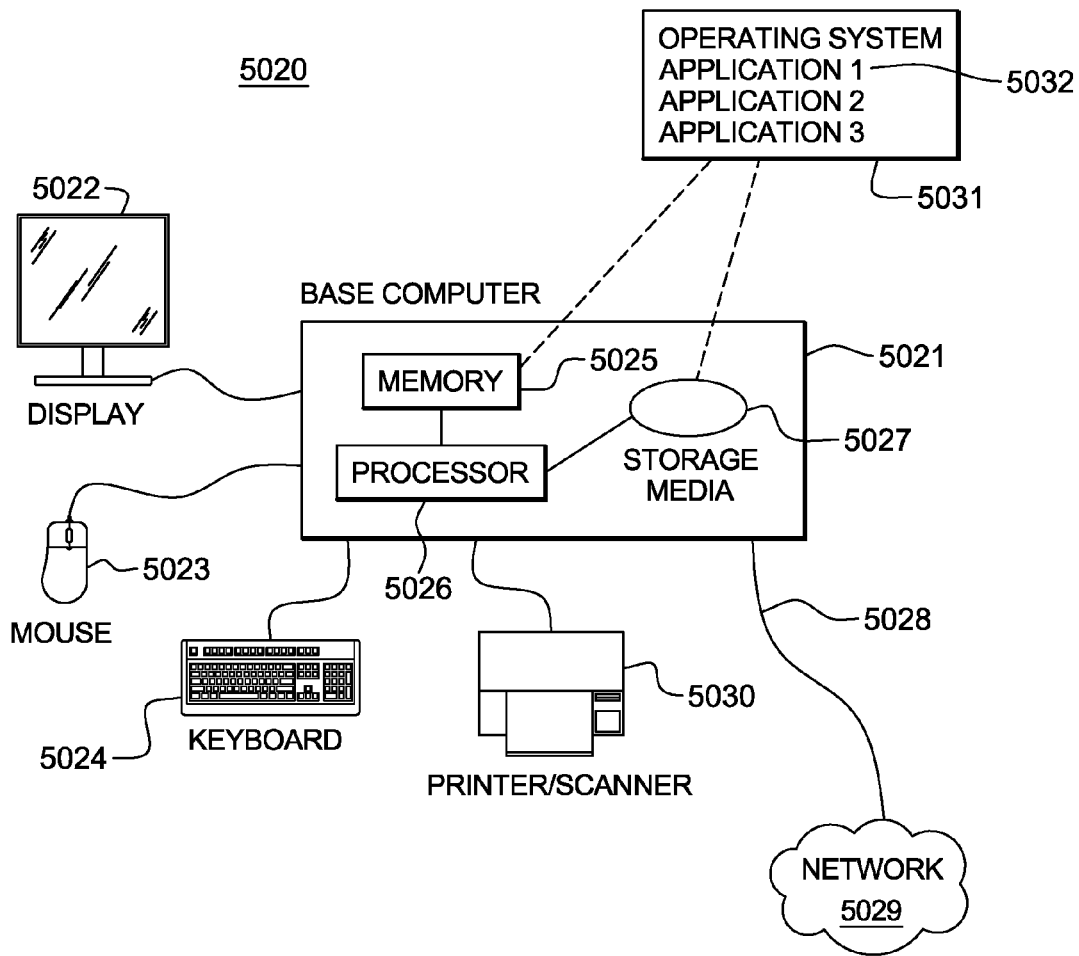
FIG. 8 depicts a further example of a computer system to incorporate and use one or more aspects of the present invention.

FIG. 8 illustrates a representative workstation or server hardware system in which one or more aspects of the present invention may be practiced. The system 5020 of FIG. 8 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 9:
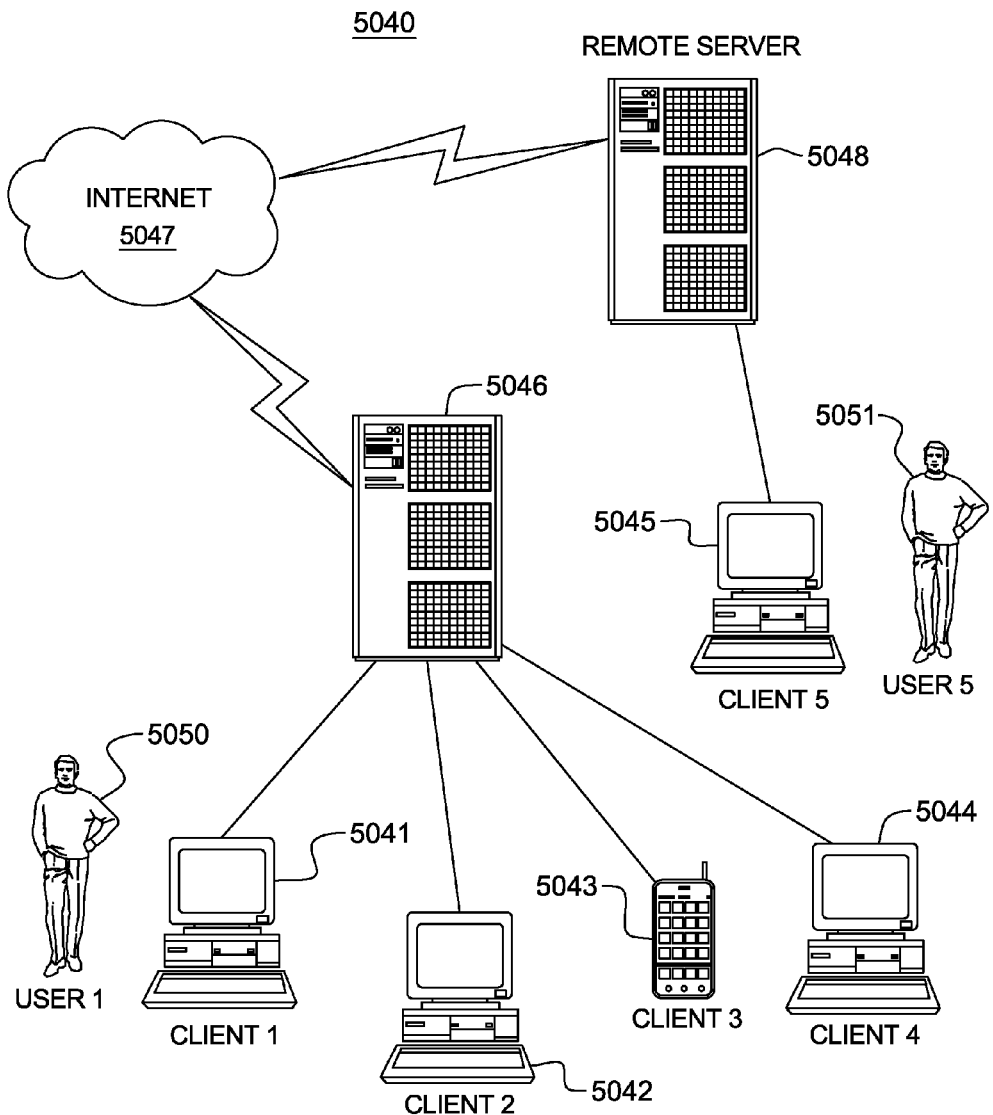
FIG. 9 depicts another example of a computer system comprising a computer network to incorporate and use one or more aspects of the present invention.

FIG. 9 illustrates a data processing network 5040 in which one or more aspects of the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 9, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 8 and FIG. 9, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 10:
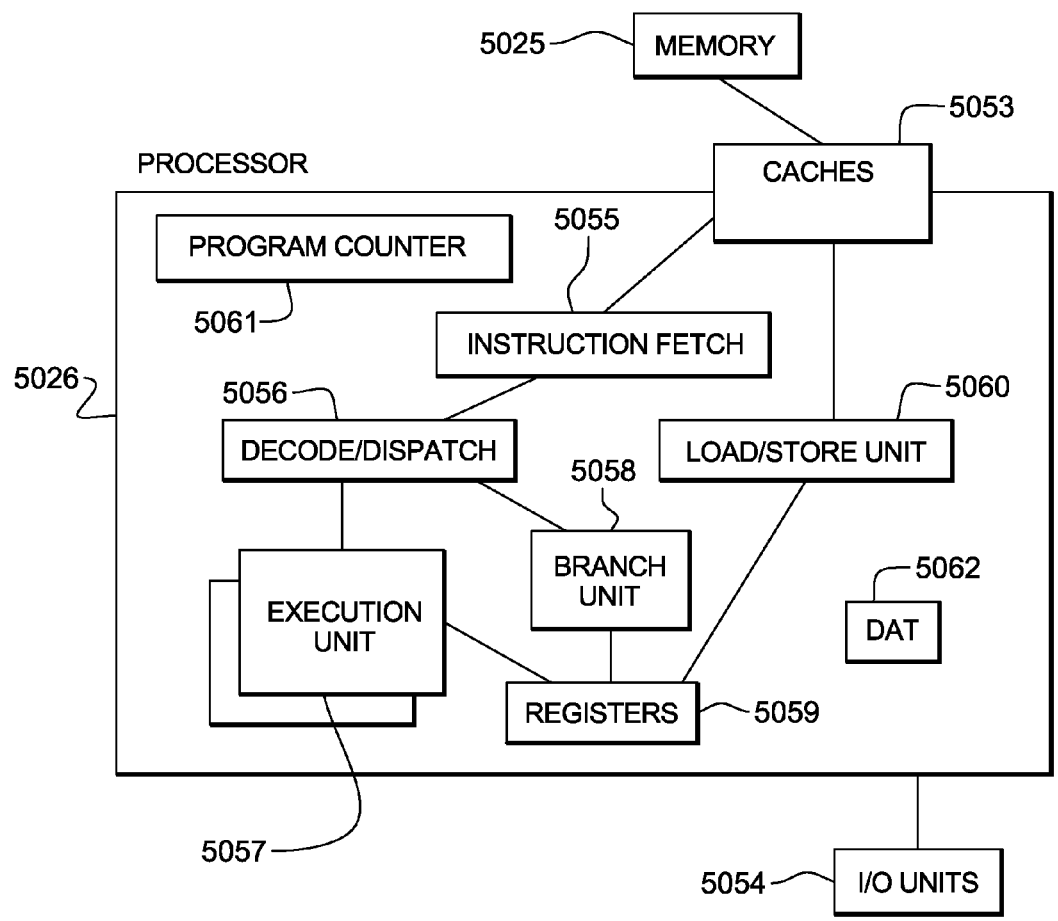
FIG. 10 depicts one embodiment of various elements of a computer system to incorporate and use one or more aspects of the present invention.

Referring to FIG. 10, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 11A:
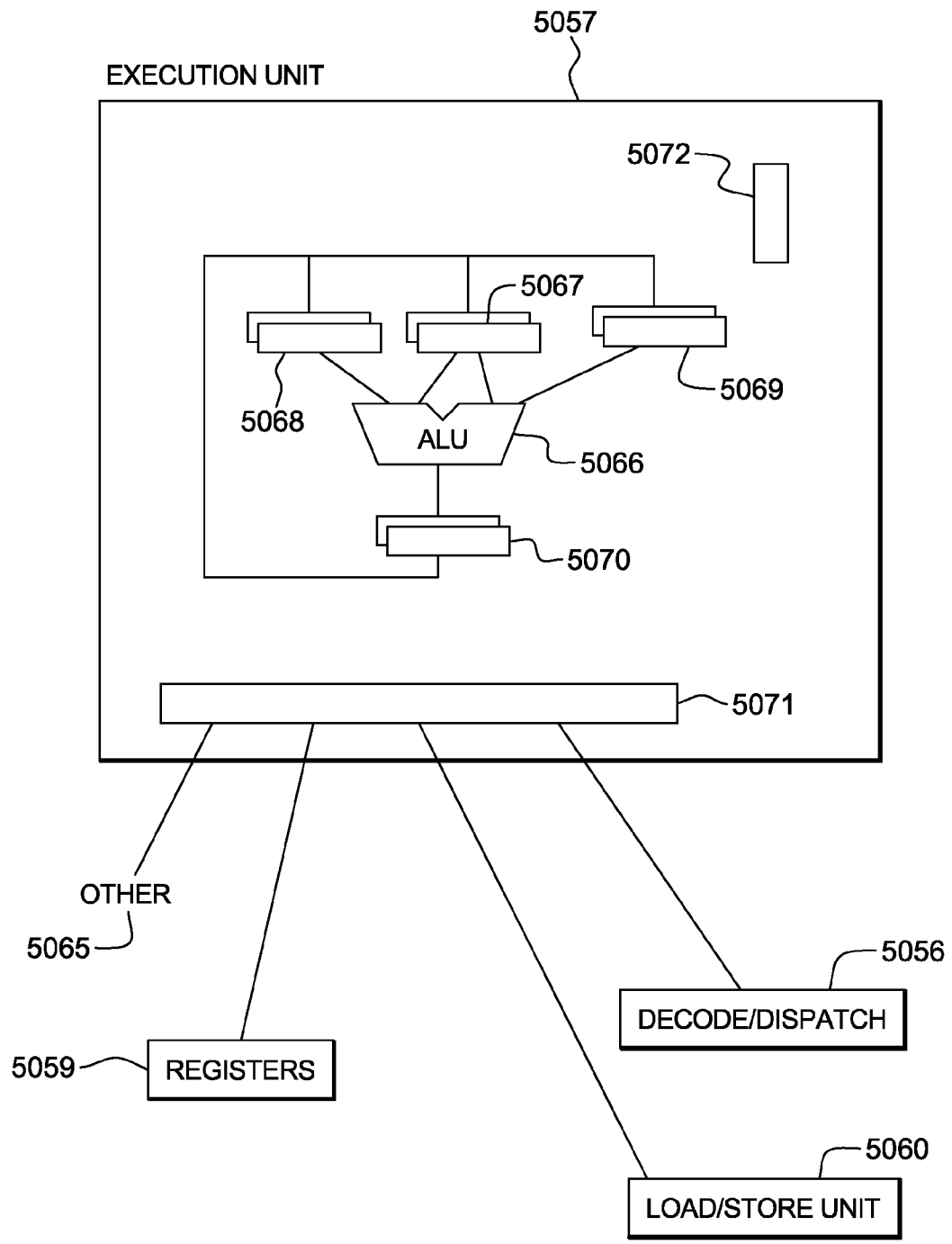
FIG. 11A depicts one embodiment of the execution unit of the computer system of FIG. 10 to incorporate and use one or more aspects of the present invention.

A processor 5026 typically has one or more units 5057, 5058, 5060 for executing the function of the instruction. Referring to FIG. 11A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 11B:
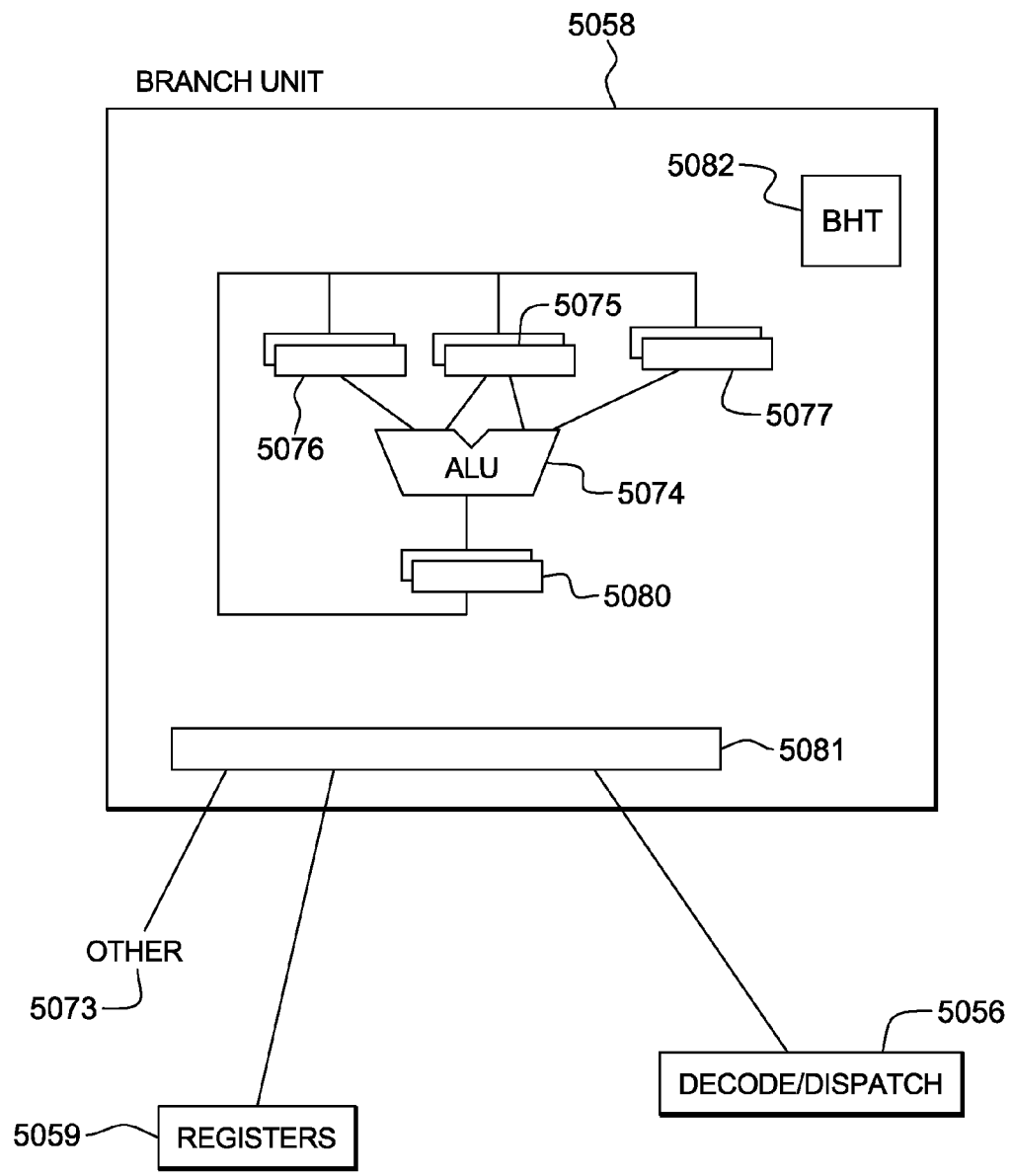
FIG. 11B depicts one embodiment of the branch unit of the computer system of FIG. 10 to incorporate and use one or more aspects of the present invention.

Referring to FIG. 11B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 11C:
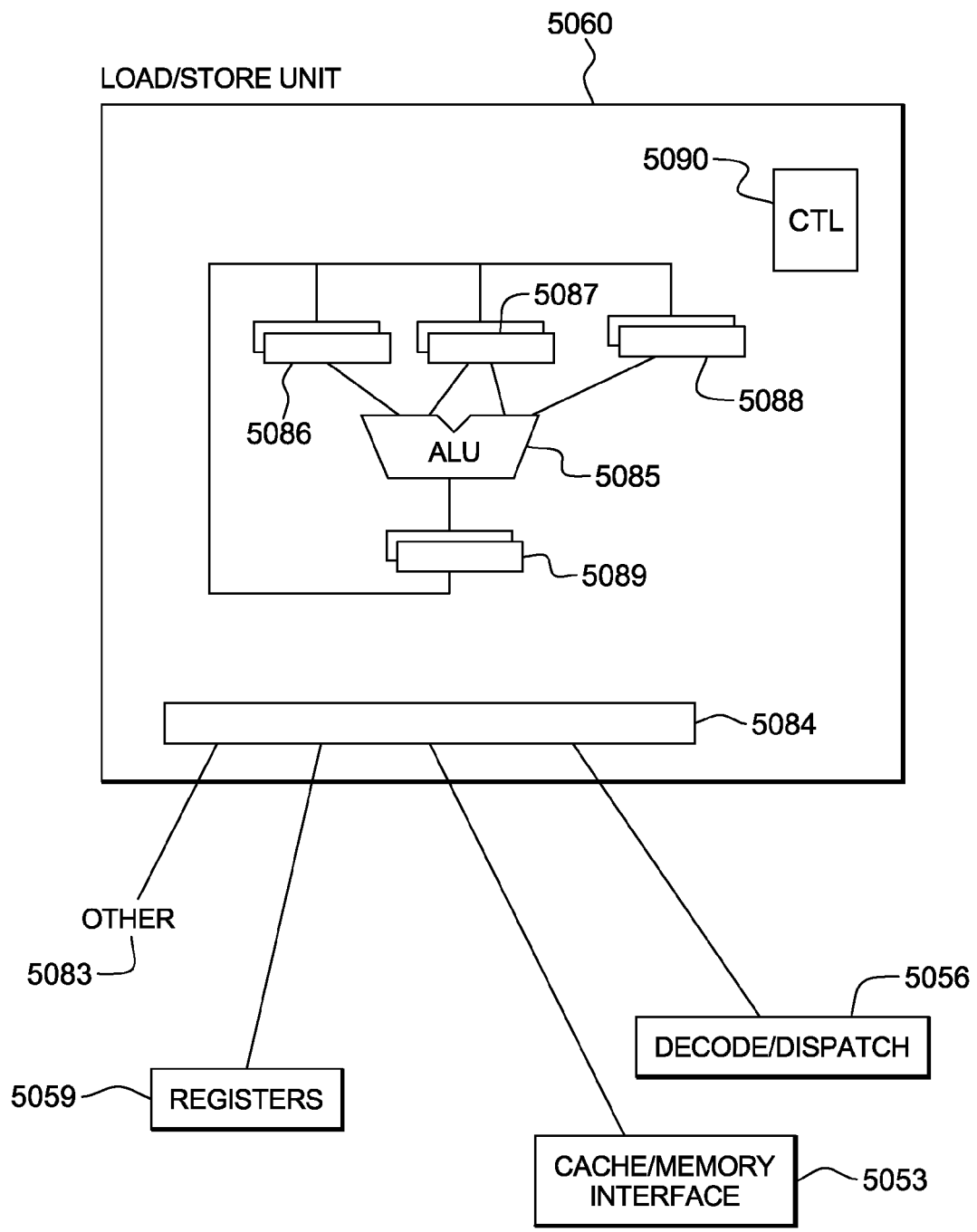
FIG. 11C depicts one embodiment of the load/store unit of the computer system of FIG. 10 to incorporate and use one or more aspects of the present invention.

Referring to FIG. 11C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 10) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C"

programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 12:
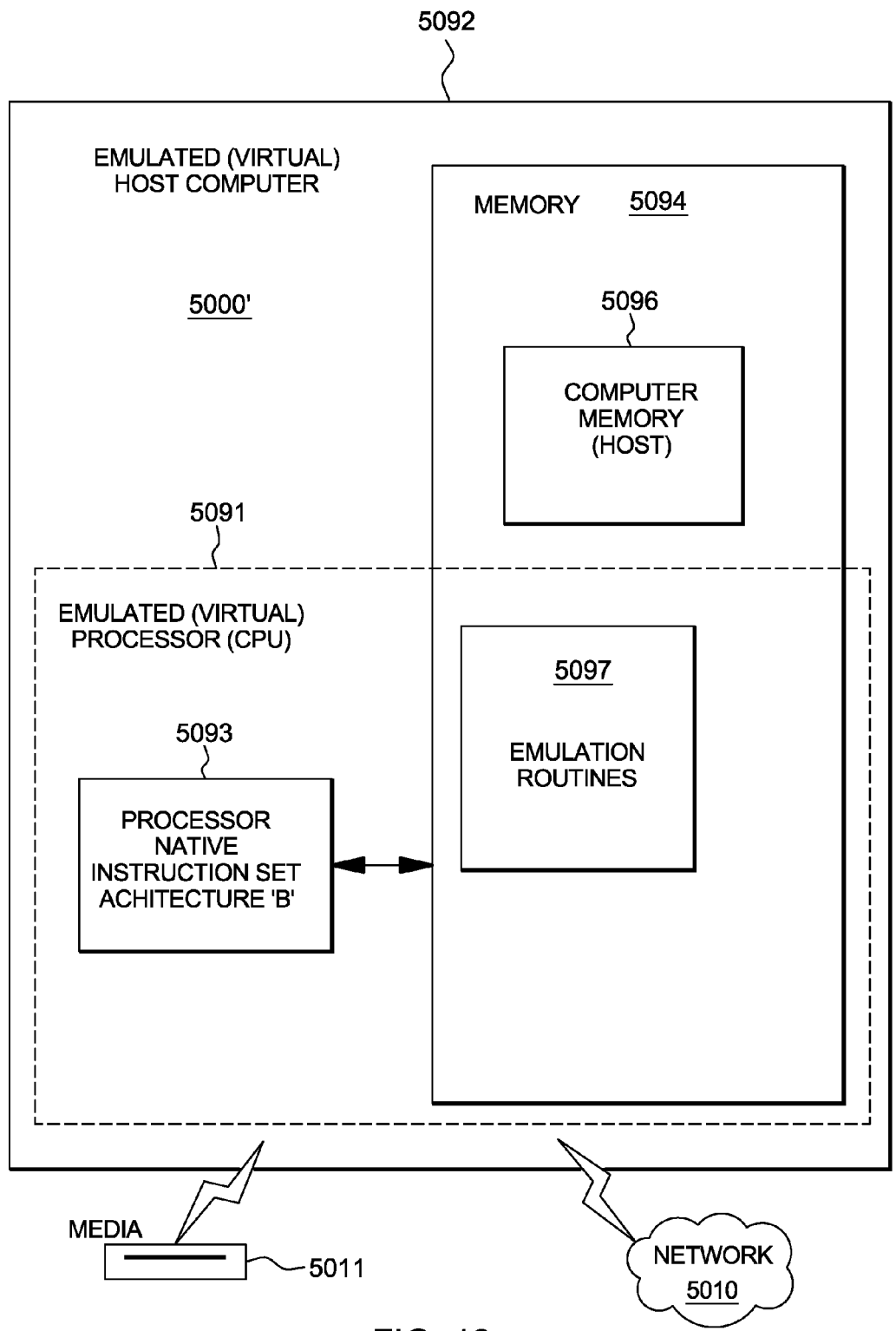
FIG. 12 depicts one embodiment of an emulated host computer system to incorporate and use one or more aspects of the present invention.

In FIG. 12, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating communications in a communications environment, said computer program product comprising:
a non-transitory computer readable storage medium readable by a processing circuit and storing instructions for execution by the processing circuit for performing a method comprising:
obtaining, by a processor of the communications environment from a sender of the communications environment, pre-authorization to convert from a synchronous data transfer to an asynchronous data transfer, wherein the pre-authorization includes obtaining an indication of a memory block to track the asynchronous data transfer;
obtaining, by the processor from the sender, a request to send data to a receiver of the communications environment;
initiating, by the processor, a sending of the data to the receiver, wherein the initiating employs the synchronous data transfer;
determining, by the processor, that the synchronous data transfer is to be converted to an asynchronous data transfer; and
based on the determining, automatically converting by the processor the synchronous data transfer to the asynchronous data transfer to complete the sending of the data to the receiver, wherein the automatically converting is independent of actions by the sender other than the pre-authorization.

2. The computer program product of claim 1, wherein the determining comprises determining that the receiver is delayed in being able to receive the data at a time the data is being sent, and based thereon, automatically converting the synchronous data transfer to the asynchronous data transfer to complete the sending of the data at a time in which the receiver can receive the data.

3. The computer program product of claim 2, wherein the automatically converting comprises:
storing the request in the memory block;
queuing the memory block to a queue of the receiver;
determining that the receiver is able to receive the data; and
sending the data to the receiver using the memory block.

4. The computer program product of claim 3, wherein the determining that the receiver is able to receive the data comprises determining that the receiver has an empty buffer to receive the data.

5. The computer program product of claim 3, wherein the method further comprises indicating completion of the sending to the sender.

6. The computer program product of claim 5, wherein the indicating completion comprises posting an address of the memory block on a completion queue in memory accessible to the sender.

7. The computer program product of claim 6, wherein the method further comprises generating an interruption to the sender, based on posting the address on the completion queue.

8. The computer program product of claim 2, wherein the determining the receiver is delayed comprises determining that a receive buffer is unavailable to receive the data.

9. The computer program product of claim 1, wherein the method further comprises obtaining another request from the sender, the another request to be sent to another receiver synchronously prior to completion of sending the request to the receiver asynchronously.

10. The computer program product of claim 1, wherein the method further comprises receiving one or more additional requests from the sender prior to completing the sending of the data asynchronously to the receiver, wherein data of the one or more additional requests can be sent synchronously or asynchronously to one or more receivers.

11. The computer program product of claim 1, wherein the method further comprises maintaining a data arrival order at the receiver, based on converting from the synchronous data transfer to the asynchronous data transfer.

12. A computer system for facilitating communications in a communications environment, said computer system comprising:
a memory; and
a processor in communications with the memory, wherein the computer system is configured to perform a method, said method comprising:
obtaining, by a processor of the communications environment from a sender of the communications environment, pre-authorization to convert from a synchronous data transfer to an asynchronous data transfer, wherein the pre-authorization includes obtaining an indication of a memory block to track the asynchronous data transfer;
obtaining, by the processor from the sender, a request to send data to a receiver of the communications environment;
initiating, by the processor, a sending of the data to the receiver, wherein the initiating employs the synchronous data transfer;
determining, by the processor, that the synchronous data transfer is to be converted to an asynchronous data transfer; and
based on the determining, automatically converting by the processor the synchronous data transfer to the asynchronous data transfer to complete the sending of the data to the receiver, wherein the automatically converting is independent of actions by the sender other than the pre-authorization.

13. The computer system of claim 12, wherein the determining comprises determining that the receiver is delayed in being able to receive the data at a time the data is being sent, and based thereon, automatically converting the synchronous data transfer to the asynchronous data transfer to complete the sending of the data at a time in which the receiver can receive the data.

14. The computer system of claim 13, wherein the automatically converting comprises:
storing the request in the memory block;
queuing the memory block to a queue of the receiver;
determining that the receiver is able to receive the data; and
sending the data to the receiver using the memory block.

15. The computer system of claim 14, wherein the determining that the receiver is able to receive the data comprises determining that the receiver has an empty buffer to receive the data.

16. The computer system of claim 14, wherein the method further comprises indicating completion of the sending to the sender.

17. The computer system of claim 16, wherein the indicating completion comprises posting an address of the memory block on a completion queue in memory accessible to the sender.

18. The computer system of claim 17, wherein the method further comprises generating an interruption to the sender, based on posting the address on the completion queue.

19. The computer program product of claim 12, wherein the method further comprises obtaining another request from the sender, the another request to be sent to another receiver synchronously prior to completion of sending the request to the receiver asynchronously.

20. The computer program product of claim 12, wherein the method further comprises receiving one or more additional requests from the sender prior to completing the sending of the data asynchronously to the receiver, wherein data of the one or more additional requests can be sent synchronously or asynchronously to one or more receivers.

* * * * *